(12) United States Patent
Sugiura et al.

(10) Patent No.: US 8,086,379 B2
(45) Date of Patent: Dec. 27, 2011

(54) CONTROL APPARATUS FOR AUTOMATIC TRANSMISSION

(75) Inventors: Tadashi Sugiura, Anjo (JP); Yosuke Takei, Anjo (JP); Hideaki Ogasawara, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 619 days.

(21) Appl. No.: 12/314,818

(22) Filed: Dec. 17, 2008

(65) Prior Publication Data

US 2009/0171539 A1 Jul. 2, 2009

(30) Foreign Application Priority Data

Dec. 27, 2007 (JP) .................................. 2007-338150

(51) Int. Cl.
B60W 10/10 (2006.01)
(52) U.S. Cl. ............................. 701/52; 701/55; 475/131
(58) Field of Classification Search .................. 701/51, 701/52, 55, 56, 58; 475/131; 477/97, 118–120
See application file for complete search history.

(56) References Cited

U.S. PATENT DOCUMENTS

| | | | |
|---|---|---|---|
| 4,905,530 A | 3/1990 | Stehle et al. | |
| 4,987,792 A | 1/1991 | Mueller et al. | |
| 5,044,220 A | 9/1991 | Raff et al. | |
| 5,062,314 A | 11/1991 | Maier et al. | |
| 5,070,740 A | 12/1991 | Giek et al. | |
| 6,553,856 B2 * | 4/2003 | Svendsen | 74/335 |
| 7,258,649 B2 * | 8/2007 | Matsunaga et al. | 477/120 |
| 7,780,571 B2 * | 8/2010 | Yagi et al. | 477/121 |
| 2003/0232680 A1 | 12/2003 | Matsunaga et al. | |
| 2006/0014610 A1 | 1/2006 | Matsunaga et al. | |

FOREIGN PATENT DOCUMENTS

| | | |
|---|---|---|
| JP | A-10-324169 | 12/1998 |
| JP | A-11-51169 | 2/1999 |
| JP | A-2001-295916 | 10/2001 |
| JP | A-2004-60837 | 2/2004 |
| JP | A 2005-351482 | 12/2005 |
| JP | A-2006-112564 | 4/2006 |

\* cited by examiner

Primary Examiner — Richard M. Camby
(74) Attorney, Agent, or Firm — Oliff & Berridge, PLC

(57) ABSTRACT

A control apparatus for an automatic transmission capable of operating in an automatic shift mode in which a speed ratio is automatically selected based on driving conditions of a vehicle, and a manual shift mode in which the speed ratio is changed based on an upshift command and a downshift command by manual operation of a manual operation unit, the control apparatus includes a controller that operates in a jumping shift mode that is included in the manual shift mode and that is composed of a smaller number of shift speeds than a number of shift speeds of the automatic shift mode; wherein the controller performs a downshift from a shift speed of the jumping shift mode at a time when the downshift command is issued by an operation of the manual operation unit based on the shift speed of the jumping shift mode.

18 Claims, 6 Drawing Sheets

FIG. 2
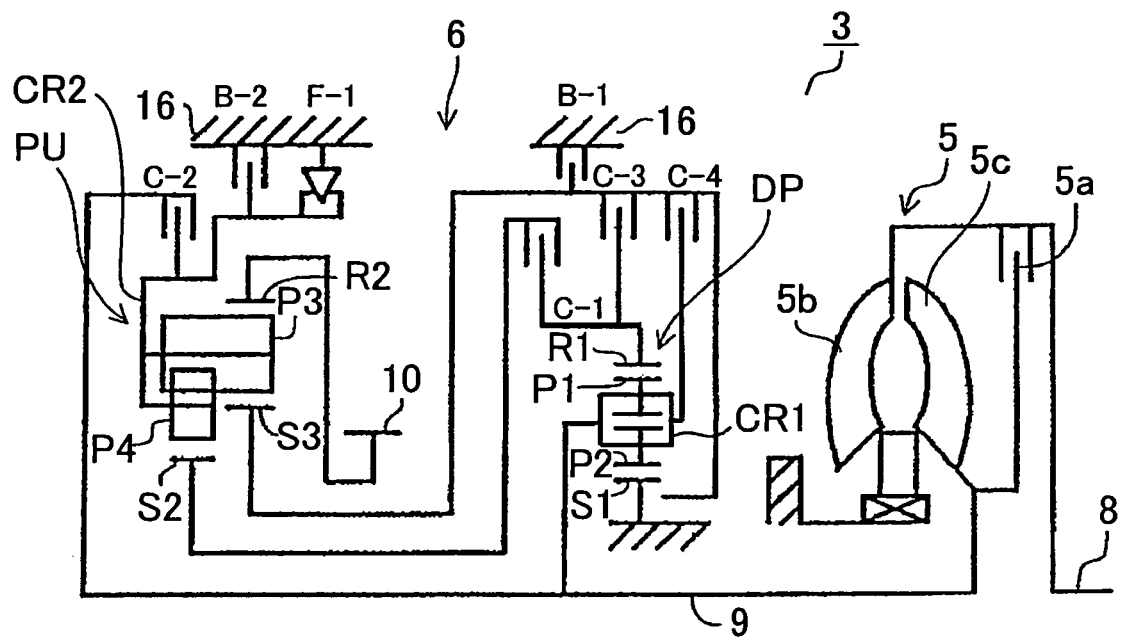
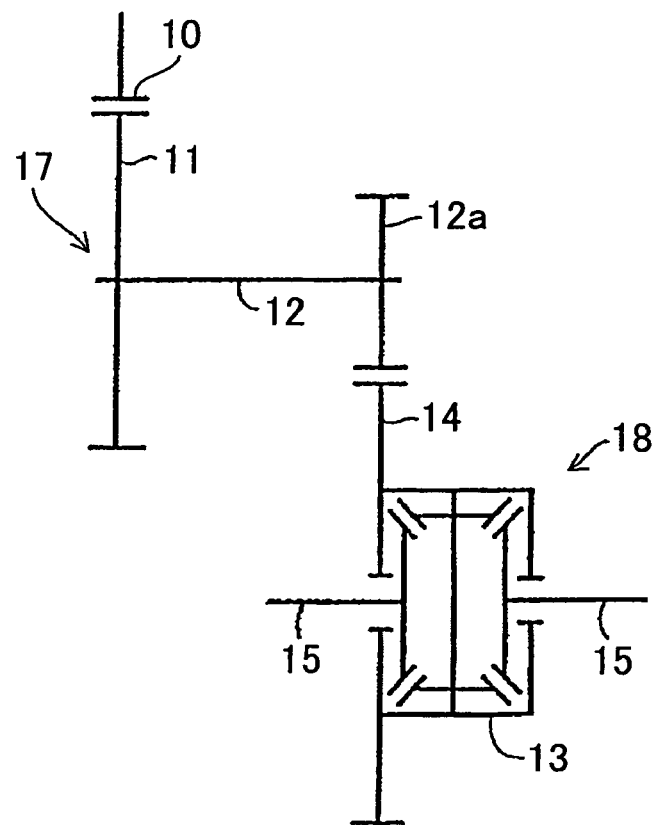

FIG.3

|  | C-1 | C-2 | C-3 | C-4 | B-1 | B-2 | F-1 |
|---|---|---|---|---|---|---|---|
| 1st | ● | | | | | (●) | ● |
| 2nd | ● | | | | ● | | |
| 3rd | ● | | ● | | | | |
| 4th | ● | | | ● | | | |
| 5th | ● | ● | | | | | |
| 6th | | ● | | ● | | | |
| 7th | | ● | ● | | | | |
| 8th | | ● | | | ● | | |
| Rev1 | | | ● | | | ● | |
| Rev2 | | | | ● | | ● | |

(●): ENGINE BRAKE IN OPERATION

CONTROL APPARATUS FOR AUTOMATIC TRANSMISSION

INCORPORATION BY REFERENCE

The disclosure of Japanese Patent Application No. 2007-338150 filed on Dec. 27, 2007 including the specification, drawings and abstract is incorporated herein by reference in its entirety.

BACKGROUND

The present invention relates to a control apparatus for an automatic transmission.

An automatic transmission is structured so as to be capable of driving the vehicle or the like at an appropriate speed ratio without a shift operation by a driver, by automatically judging a speed ratio (shift speed) based on an accelerator opening and a vehicle speed particularly during forward driving. However, in recent years, in order to meet such a demand for sports driving and a delicate selection of engine braking, for example, automatic transmissions have been proposed that allow a so-called manual shift operation in which the driver can select a speed ratio (shift speed) (see for example, Japanese Patent Application Publication No. JP-A-10-324169).

In recent years, since improvements in vehicle fuel consumption and so on are required, multi-speed automatic transmissions, such as those achieving six or more forward speeds, are becoming common in the category of stepped automatic transmissions. Moreover, automatic transmissions such as belt-driven CVTs, that steplessly change speed, are also structured so as to be capable of selecting simulated shift speeds by finely spacing the speed ratios (for example, six speeds or more).

SUMMARY

However, in order to obtain a large torque or engine brake force, for example, during driving on a hill or while attempting a rapid acceleration with the automatic transmission provided with the finely spaced (multi-speed) speed ratios (shift speeds) such as described above, it is required to change the speed ratio (shift speed) through, for example, two or three speeds. Particularly, in the case of the manual shift operation as described above, there has been a problem in that the driver needs to successively perform the manual shift operation a multiple number of times in a short period of time, resulting in the troublesome operation that is not preferable in terms of drivability of the vehicle.

Moreover, when performing the manual shift operation as described above, the trouble of the operation is expected to be eased by structuring the automatic transmission so that a command for multiple-speed shift is executed, for example, by a so-called long pressing operation in which a control lever or the like is kept to be pressed in the downshift command position. However, when taking into account the time for the long pressing required for judgment to prevent an erroneous operation from occurring, a long time is required for completing the shift command, resulting in a lack of response performance that is particularly unfavorable to sports driving. In addition, because the shift command is increased by one speed for each operation, the shifting of the automatic transmission is performed one speed at a time, that is, for example, in the sequence of 6th, 5th, 4th, and 3rd, resulting in the generation of successive speed shifts, and thus causing a problem not preferable in terms of driveability.

Therefore, the present invention provides a control apparatus for an automatic transmission that is capable of quickly downshifting to a speed ratio desired by a driver without involving a troublesome operation when performing an operation based on a downshift command by using a manual operation unit. The present invention can also achieve various other advantages.

According to an exemplary control apparatus for an automatic transmission capable of operating in an automatic shift mode in which a speed ratio is automatically selected based on driving conditions of a vehicle, and a manual shift mode in which the speed ratio is changed based on an upshift command and a downshift command by manual operation of a manual operation unit, the control apparatus includes a controller that operates in a jumping shift mode that is included in the manual shift mode and that is composed of a smaller number of shift speeds than a number of shift speeds of the automatic shift mode; wherein the controller performs a downshift from a shift speed of the jumping shift mode at a time when the downshift command is issued by an operation of the manual operation unit based on the shift speed of the jumping shift mode.

According to an exemplary aspect of the invention, a control apparatus includes a controller that operates in a jumping shift mode that is included in a manual shift mode and that is composed of a smaller number of shift speeds than a number of shift speeds of an automatic shift mode; wherein the controller performs a downshift from a shift speed of the jumping shift mode at a time when a downshift command is issued by an operation of a manual operation unit based on the shift speed of the jumping shift mode.

According to an exemplary method of controlling an automatic transmission capable of operating in an automatic shift mode in which a speed ratio is automatically selected based on driving conditions of a vehicle, and a manual shift mode in which the speed ratio is changed based on an upshift command and a downshift command by manual operation of a manual operation unit, the method includes determining whether an operator has operated the manual operation unit in order to move from the automatic shift mode to the manual shift mode; and operating in a jumping shift mode that is included in the manual shift mode and that is composed of a smaller number of shift speeds than a number of shift speeds of the automatic shift mode when the operator moves to the manual shift mode; wherein a downshift from a shift speed of the jumping shift mode is performed at a time when the downshift command is issued by an operation of the manual operation unit based on the shift speed of the jumping shift mode.

BRIEF DESCRIPTION OF THE DRAWINGS

Various exemplary aspects of the invention will be described with reference to the drawings, wherein:

FIG. 2 is a skeleton diagram showing an automatic transmission that can be applied to an embodiment of the present invention;

FIG. 3 is an engagement table of the present automatic transmission;

FIG. 5A shows a diagram for an 8-speed automatic transmission according to an embodiment of the present invention, and FIG. 5B shows a diagram for a 5-speed automatic transmission serving as a reference.

DETAILED DESCRIPTION OF EMBODIMENTS

Figure 1:
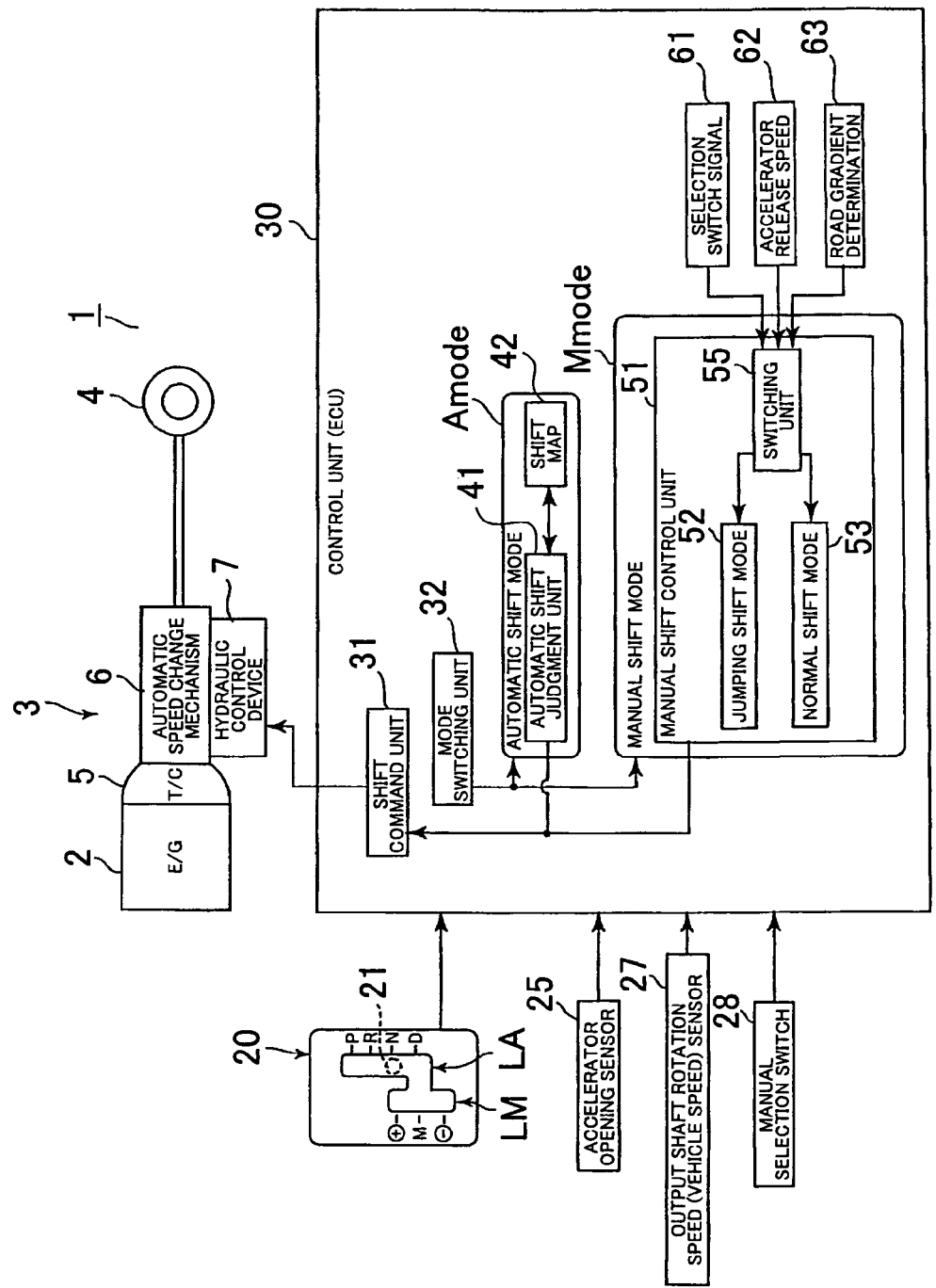
FIG. 1 is a block diagram showing a control apparatus for an automatic transmission according to an embodiment of the present invention.

Embodiments according to the present invention will be described below with reference to the drawings. First, an outline structure of an automatic transmission 3 to which an aspect of the present invention can be applied will be described mainly with reference to FIG. 2. As shown in FIG. 1, the automatic transmission 3 is provided so as to be interposed between an engine (E/G) 2 and driving wheels 4, and is structured so as to include, in a broad sense, a torque converter (T/C) 5, an automatic speed change mechanism (speed change gear mechanism) 6, and a hydraulic control device 7.

As shown in FIG. 2, the automatic transmission 3 that is suitable for use in, for example, an FF (front engine, front drive) type vehicle has an input shaft 8 that can be connected to the engine 2 (refer to FIG. 1). The torque converter 5 connected to the input shaft 8 has a pump impeller 5b operatively coupled with the input shaft 8, and a turbine runner 5c to which the rotation of the pump impeller 5b is transmitted through hydraulic fluid, the turbine runner 5c being connected to an input shaft 9 of the automatic speed change mechanism 6 that is arranged coaxially with the input shaft 8. In addition, the torque converter 5 is provided with a lockup clutch 5a, and when the lockup clutch 5a is engaged by hydraulic control of the hydraulic control device 7 (refer to FIG. 1), the rotation of the input shaft 8 of the automatic transmission 3 is directly transmitted to the input shaft 9 of the automatic speed change mechanism 6.

The automatic speed change mechanism 6 is provided with a planetary gear DP and a planetary gear unit PU on the input shaft 9. The planetary gear DP is a so-called double pinion planetary gear which is provided with a sun gear S1, a carrier CR1, and a ring gear R1, where the carrier CR1 has, in an intermeshing manner, a pinion P2 that meshes with the sun gear S1 and a pinion P1 that meshes with the ring gear R1.

In addition, the planetary gear unit PU is a so-called Ravigneaux type planetary gear which has a sun gear S2, a sun gear S3, a carrier CR2, and a ring gear R2, where the carrier CR2 has, in an intermeshing manner, a long pinion P3 that meshes with the sun gear S3 and the ring gear R2, and a short pinion P4 that meshes with the sun gear S2.

The sun gear S1 of the planetary gear DP is fixed as a unit to a case 16. In addition, the carrier CR1 is connected to the input shaft 9 so as to make the same rotation as the rotation of the input shaft 9 (hereinafter called "input rotation"), and also connected to a clutch C-4. Moreover, the ring gear R1 makes a decelerated rotation which is decelerated from the input rotation by the fixed sun gear S1 and the carrier CR1 making the input rotation, and is also connected to a clutch C-1 and a clutch C-3.

The sun gear S3 of the planetary gear unit PU can be fixed to the case 16 by being connected to a brake B-1, and is also connected to the clutch C-4 and clutch C-3 to be able to receive the input rotation from the carrier CR1 through the clutch C-4 and the decelerated rotation input from the ring gear R1 through the clutch C-3. In addition, the sun gear S2 is connected to the clutch C-1 to be able to receive the decelerated rotation input from the ring gear R1.

Moreover, the carrier CR2 is connected to a clutch C-2 receiving the rotation input from the input shaft 9, to be able to receive the input rotation through the clutch C-2, and also connected to a one-way clutch F-1 and a brake B-2, to be restricted in rotation in one direction relative to the case 16 through the one-way clutch F-1 and to be able to be fixed in rotation through the brake B-2. Furthermore, the ring gear R2 is connected to a counter gear 10 that is rotatably supported by, for example, an unshown center support member fixed to the case 16.

The counter gear 10 meshes with a large diameter gear 11 arranged in a fixed manner at one end of a counter shaft 12 of a counter shaft portion 17, and a small diameter gear 12a arranged in a fixed manner at the other end of a counter shaft 12 meshes with a gear 14 of a differential portion 18. The gear 14 is operatively coupled with a differential gear 13 to be connected to right and left axle shafts (output shafts) 15 and 15, so as to be capable of absorbing the differential rotation between the right and left axle shafts through the differential gear 13.

Subsequently, based on the structure described above, the operation of the automatic transmission 3 will be described with reference to FIGS. 2 and 3.

For example, at the first forward speed (1st) in the D (drive) range, the clutch C-1 and the one-way clutch F-1 are engaged, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S2 through the clutch C-1. In addition, the rotation of the carrier CR2 is restricted to one direction (forward rotating direction); that is, the carrier CR2 is prevented from rotating in the reverse direction so as to be in a fixed state. Then, the decelerated rotation introduced to the sun gear S2 is output to the ring gear R2 through the fixed carrier CR2, and thus the forward rotation as the first forward speed is output from the counter gear 10.

In addition, during engine braking (coasting), the above-described state of the first forward speed is maintained in the manner in which the brake B-2 is locked to fix the carrier CR2 so that the carrier CR2 is prevented from rotating forward. Moreover, because the carrier CR2 is prevented from rotating in the reverse direction and allowed to rotate forward by the one-way clutch F-1 at the first forward speed, the first forward speed can be achieved smoothly by automatic engagement of the one-way clutch F-1, in the case, for example, of a shift from a non-drive range to a drive range.

At the second forward speed (2nd), the clutch C-1 is engaged and the brake B-1 is locked, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S2 through the clutch C-1. In addition, the rotation of the sun gear S3 is fixed by the locking of the brake B-1. Then, the carrier CR2 makes a decelerated rotation slower than that of the sun gear S2, and the decelerated rotation introduced to the sun gear S2 is output to the ring gear R2 through the carrier CR2. Thus, the forward rotation as the second forward speed is output from the counter gear 10.

At the third forward speed (3rd), the clutch C-1 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S2 through the clutch C-1. In addition, the decelerated rotation of the ring gear R1 is introduced to the sun gear S3 by the engagement of the clutch C-3. That is, the decelerated rotation of the ring gear R1 is introduced to the sun gear S3 and the sun gear S2. Therefore, the planetary gear unit PU takes the state of direct connection of the decelerated rotation to output the decelerated rotation directly to the ring gear R2. Thus, the forward rotation as the third forward speed is output from the counter gear 10.

At the fourth forward speed (4th), the clutch C-1 and the clutch C-4 are engaged, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S2 through the clutch C-1. In addition, the input rotation of the carrier CR1 is introduced to the sun gear S3 by the engagement of the clutch C-4. Then, the carrier CR2 makes a decelerated rotation faster than that of the sun gear S2, and the decelerated rotation introduced to the sun gear S2 is output to the ring gear R2 through the carrier CR2. Thus, the forward rotation as the fourth forward speed is output from the counter gear 10.

At the fifth forward speed (5th), the clutch C-1 and the clutch C-2 are engaged, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S2 through the clutch C-1. In addition, the input rotation is introduced to the carrier CR2 by the engagement of the clutch C-2. Then, a decelerated rotation faster than that of the above-described fourth forward speed is produced by the decelerated rotation introduced to the sun gear S2 and the input rotation introduced to the carrier CR2, and is output to the ring gear R2. Thus, the forward rotation as the fifth forward speed is output from the counter gear 10.

At the sixth forward speed (6th), the clutch C-2 and the clutch C-4 are engaged, as, shown in FIG. 3. Then, as shown in FIG. 2, the input rotation of the carrier CR1 is introduced to the sun gear S3 by the engagement of the clutch C-4. In addition, the input rotation is introduced to the carrier CR2 by the engagement of the clutch C-2. That is, the input rotation is introduced to the sun gear S3 and the carrier CR2. Therefore, the planetary gear unit PU takes the state of direct connection of the input rotation to output the input rotation directly to the ring gear R2. Thus, the forward rotation as the sixth forward speed is output from the counter gear 10.

At the seventh forward speed (7th), the clutch C-2 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S3 through the clutch C-3. In addition, the input rotation is introduced to the carrier CR2 by the engagement of the clutch C-2. Then, an accelerated rotation slightly faster than that of the input rotation is produced by the decelerated rotation introduced to the sun gear S3 and the input rotation introduced to the carrier CR2, and is output to the ring gear R2. Thus, the forward rotation as the seventh forward speed is output from the counter gear 10.

At the eighth forward speed (8th), the clutch C-2 is engaged and the brake B-1 is locked, as shown in FIG. 3. Then, as shown in FIG. 2, the input rotation is introduced to the carrier CR2 by the engagement of the clutch C-2. In addition, the rotation of the sun gear S3 is fixed by the locking of the brake B-1. Then, the input rotation of the carrier CR2 is made to be an accelerated rotation faster than that of the above-described seventh forward speed by the fixed sun gear S3, and is output to the ring gear R2. Thus, the forward rotation as the eighth forward speed is output from the counter gear 10.

At the first reverse speed (Rev1), the clutch C-3 is engaged and the brake B-2 is locked, as shown in FIG. 3. Then, as shown in FIG. 2, the rotation of the ring gear R1 which makes the decelerated rotation provided by the fixed sun gear S1 and the carrier CR1 making the input rotation is introduced to the sun gear S3 through the clutch C-3. In addition, the rotation of the carrier CR2 is fixed by the locking of the brake B-2. Then, the decelerated rotation introduced to the sun gear S3 is output to the ring gear R2 through the fixed carrier CR2, and thus the reverse rotation as the first reverse speed is output from the counter gear 10.

At the second reverse speed (Rev2), the clutch C-4 is engaged and the brake B-2 is locked, as shown in FIG. 3. Then, as shown in FIG. 2, the input rotation of the carrier CR1 is introduced to the sun gear S3 by the engagement of the clutch C-4. In addition, the rotation of the carrier CR2 is fixed by the locking of the brake B-2. Then, the input rotation introduced to the sun gear S3 is output to the ring gear R2 through the fixed carrier CR2, and thus the reverse rotation as the second reverse speed is output from the counter gear 10.

Note that, for example, in the P (parking) range and in the N (neutral) range, the clutches C-1, C-2, C-3, and C-4 are disengaged. Then, disconnection occurs between the carrier CR1 and the sun gear S3, between the ring gear R1 and the sun gear S3, and between the ring gear R1 and the sun gear S2, that is, between the planetary gear DP and the planetary gear unit PU. Also, the input shaft 9 and the carrier CR2 are disconnected from each other. As a result, power transmission is disconnected between the input shaft 9 and the planetary gear unit PU, that is, between the input shaft 9 and the counter gear 10.

Then, the rotation that has been output to the counter gear 10 at a speed of one of the first to eighth forward speeds, and first and second reverse speeds described above is further decelerated by the large diameter gear 11 and the small diameter gear 12a of the counter shaft 12, and is also output to the right and left axle shafts 15 and 15 through the differential gear 13 absorbing the differential rotation between the right and left axle shafts, thus being transmitted to the driving wheels 4.

Subsequently, a control apparatus 1 for the automatic transmission according to an aspect of the present invention will be described with reference to FIGS. 1 and 4 to 6.

As shown in FIG. 1, the control apparatus 1 for the present automatic transmission has a control unit (ECU) 30, to which sensors (not shown) of a shift lever unit 20, an accelerator opening sensor 25, an output shaft rotation speed (vehicle speed) sensor 27, a manual selection switch 28, and others are connected, and which, in turn, is connected to solenoid valves (not shown) of the hydraulic control device 7 for the automatic transmission 3.

The control unit (ECU) 30 is provided with a shift command unit 31, a mode switching unit 32, an automatic shift judgment unit 41 and a shift map 42 for executing an automatic shift mode Amode, and a manual shift control unit 51 for performing a manual shift mode Mmode. The manual shift control unit 51 has a jumping shift mode 52 composed, for example, of five forward speeds, and a normal shift mode 53 composed of eight forward speeds which are the same in number as those of the automatic shift mode. Either of the modes 52 and 53 can be selected by a switching unit 55. The switching unit 55 is switched based on a selection switch signal 61 of the manual selection switch 28, on an accelerator release speed 62, on a road gradient determination 63, or the like.

The shift lever unit 20 is located in the vicinity of a driver, and structured so that the driver can operate a shift lever (a manual operation unit) 21 sketchily indicated by a dashed line in the diagram, to select the shift lever position. The present shift lever unit 20 is structured so as to be arranged with a range selection lane LA used only for selecting a shift range for use as an automatic transmission, and a manual shift lane LM used by the driver for manually indicating a shift speed. That is, in the range selection lane LA, manipulating the position of the shift lever 21 can select any of position "P" (parking range position), position "R" (reverse range position), position "N" (neutral range position), and position "D" (drive range position), as is commonly known. In addition, the shift lever 21 can be moved from position "D" to the manual shift lane LM, in which the shift lever 21 can be operated to select position "M" (fixed shift position), position "+" (upshift position), or position "−" (downshift position). Each of the positions of the shift lever 21 mentioned above is detected by each sensor that is omitted from illustration located in each position, and sent as an output to the control unit 30. Note that the shift lever 21 is urged, for example, by a spring, toward position "M" from position "+" or position "−" so as to be automatically returned to position "M" after the operation by the driver.

Note that, in the present embodiments, examples in which the manual shift command is issued by using the shift lever will be described. However, not limited to this case, any unit may be used if it can issue the manual shift command. For example, one where a steering wheel is provided with a button for upshift and a button for downshift, or one where the back face of the steering wheel is provided with a paddle for upshift and a paddle for downshift may be used.

In addition, in the description below, examples will be explained in which the shift speed is fixed when the shift position is at "M", as the present embodiments. However, not limited to this case, when the shift position is at "M", the automatic shift may be performed between upper limit shift speeds that have been determined by an upshift command and a downshift command.

In the shift lever unit 20, when the shift lever 21 has been operated to select position "D", the mode switching unit 32 selects the automatic shift mode Amode (switches the mode from the manual shift mode Mmode to the automatic shift mode Amode if the position has been moved from position "M" to position "D"), and in response, the automatic shift judgment unit 41 performs the automatic shift referring to the shift map 42 based on the accelerator opening detected by the accelerator opening sensor 25 and on the vehicle speed detected by the output shaft rotation speed sensor 27. That is, upshift lines and downshift lines (shift points) corresponding to the accelerator opening and the vehicle speed are recorded on the shift map 42, and when the accelerator opening and the vehicle speed at the time cross over those shift lines, the automatic shift judgment unit 41 judges to shift speeds. Then, in response to the judgment made by the automatic shift judgment unit 41 to shift speeds, the shift command unit 31 controls the solenoid valve (not shown) of the hydraulic control device 7 by electric command so as to achieve the judged shift speed, thus bringing the automatic transmission 3 into the state of the judged shift speed.

In the shift lever unit 20, when the shift lever 21 has been operated (switched) to change selection from position "D" to position "M", the mode switching unit 32 selects the manual shift mode Mmode (switches the mode from the automatic shift mode Amode to the manual shift mode Mmode). Then, as a general rule (in the case of the normal shift mode), the manual shift control unit 51 judges to downshift by one speed every time a downshift command is issued by one operation of the shift lever 21 into position "−" and conversely judges to upshift by one speed every time an upshift command is issued by one operation of the shift lever 21 into position "+". When the manual shift control unit 51 has judged to upshift or downshift as described above, the shift command unit 31 controls the solenoid valve (not shown) of the hydraulic control device 7 by electric command so as to achieve the judged shift speed, thus bringing the automatic transmission 3 into the state of the judged shift speed, in the same manner as described above.

However, based on the accelerator opening and the vehicle speed, if there is a problem about the shift speed to be shifted to, that is, if the shifting is concerned to cause the engine to be over-revved or stalled, the manual shift control unit 51 cancels the shift operation of the shift lever 21 conducted by the driver with, for example, a warning sound for notification at the driver's seat. In addition, as a matter of course, the manual shift control unit 51 cancels an upshift from the above-mentioned eighth forward speed (highest shift speed) and a downshift from the above-mentioned first forward speed (lowest shift speed). Moreover, if it is unfavorable to keep the shift speed unchanged because, for example, the engine is concerned to be stalled by a drop of the vehicle speed without shift operation of the shift lever 21 by the driver, the manual shift control unit 51 forces shifting to a shift speed that achieves a favorable state, with, for example, a warning sound for notification at the driver's seat.

Figure 4:
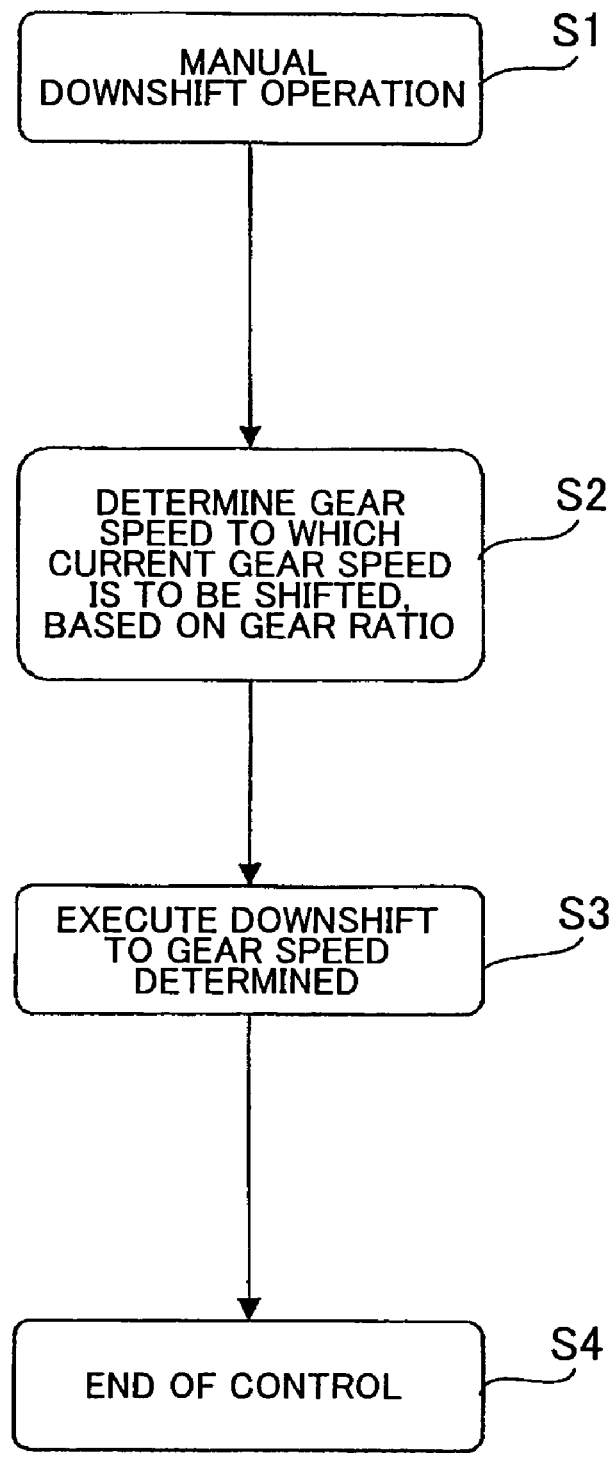
FIG. 4 is a flow chart showing a jumping shift mode according to an embodiment of the present invention.

Subsequently, the manual shift mode that forms an exemplary aspect of the present invention will be described. In a first embodiment, the manual shift mode (Mmode) is provided with only the jumping shift mode 52, as shown in FIG. 4. Therefore, the present first embodiment needs neither the normal shift mode 53 nor the switching unit 55, shown in FIG. 1.

Figure 5A:
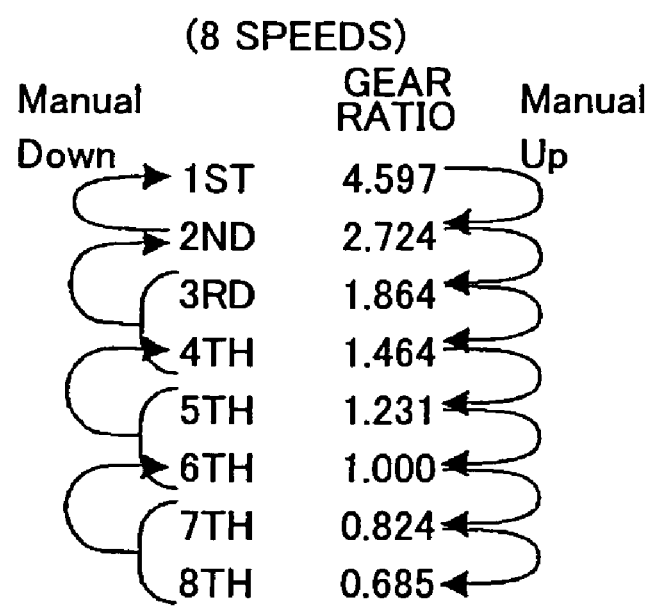
FIGS. 5A and 5B are diagrams indicating the specific shift speeds (gear speeds) in the above-mentioned flow chart.
Figure 5B:
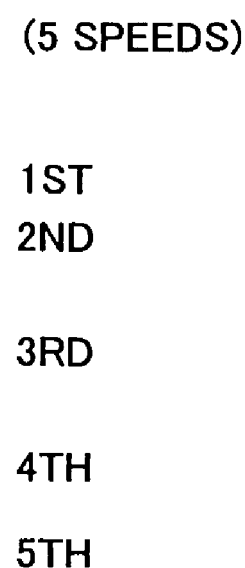

In the automatic transmission 3, although the automatic shift mode has the eight forward speeds as shown in FIG. 3, the jumping shift mode 52 is set to have a smaller number of shift speeds than the number of shift speeds of the automatic shift mode (Amode), regarding the downshift. Specifically, as shown in FIG. 5A, the automatic shift mode has the eight shift speeds of the first forward speed (1st) to the eighth forward speed (8th) that are formed with predetermined gear ratios. For the downshift in the jumping shift mode 52 of the manual shift mode, each pair of the seventh and eighth speeds, the fifth and sixth speeds, and the third and fourth speeds are respectively merged into a single shift speed, and the second speed and the first speed are respectively set as independent shift speeds. As a result, a map is provided so as to virtually form five forward speeds although the gear ratios differ. Note that, even in the jumping shift mode 52, the eight forward speeds formed with single shift speeds are applied to the upshift, in the same manner as in the normal shift mode.

The operation of the jumping shift mode 52 will be described with reference to FIG. 4. The jumping shift mode 52 is activated when the driver has operated the shift lever 21 to move from position D to position M to switch the mode to the manual shift mode (Mmode). Then, in this state, the shift lever 21 is subjected to a downshift operation, specifically, one operation into position "−" (S1). According to the downshift command, the map of the jumping shift mode 52 determines the gear speed to be shifted to from the current gear speed (shift speed), based on the shift speed (gear ratio) at the time of the operation (S2). For example, if the operation of the shift lever 21 is performed at either the eighth speed or the seventh speed in the automatic shift mode, the sixth speed is selected in either case. Then, the downshift is executed to the gear speed (shift speed) determined by the map of the jumping shift mode 52 (S3). That is, the shift speed is set to the sixth speed in the case described above. Hereby, the downshift control by one operation of the shift lever 21 is finished (S4).

In the similar manner, when the driver has operated the shift lever once more to the downshift side, the gear speed is shifted from the sixth speed to be set to the fourth speed according to the jumping shift map, then to the second speed by one more operation to the downshift side, and to the first speed by still one more operation to the downshift side. Therefore, for example, four operations of the shift lever 21, that is, the operations to the sixth speed, to the fourth speed, to the second speed, and to the first speed are sufficient to perform the manual downshift from the eighth speed to the first speed in the present jumping shift mode 52. Hereby, the driver can quickly perform the downshift to the desired shift speed. Then, by operating the shift lever 21 to move from position M to position D, the control of the manual shift mode, accordingly the jumping shift mode, is finished.

Note that, in the present jumping shift mode 52, the upshift operation performs the upshift by one shift speed every time the shift lever 21 is operated to the upshift side, in accordance with the shift speeds (eight forward speeds) of the present automatic speed change mechanism. Besides, the shift speeds (gear speeds) employed in the downshift are not limited to those in the embodiment described above. For example, the shift speeds may be composed of one group of the eighth, seventh, and sixth speeds, the fifth speed, the third speed, the second speed, and the first speed. Moreover, the shift speeds may be composed of three speeds, that is, one group of the eighth, seventh, and sixth speeds, another group of the fifth, fourth, and third speeds, and still another group of the second and first speeds. In this case, at the eighth speed, every time the shift lever is operated to the downshift side, the downshift is performed to the third speed and then to the first speed.

Figure 6:
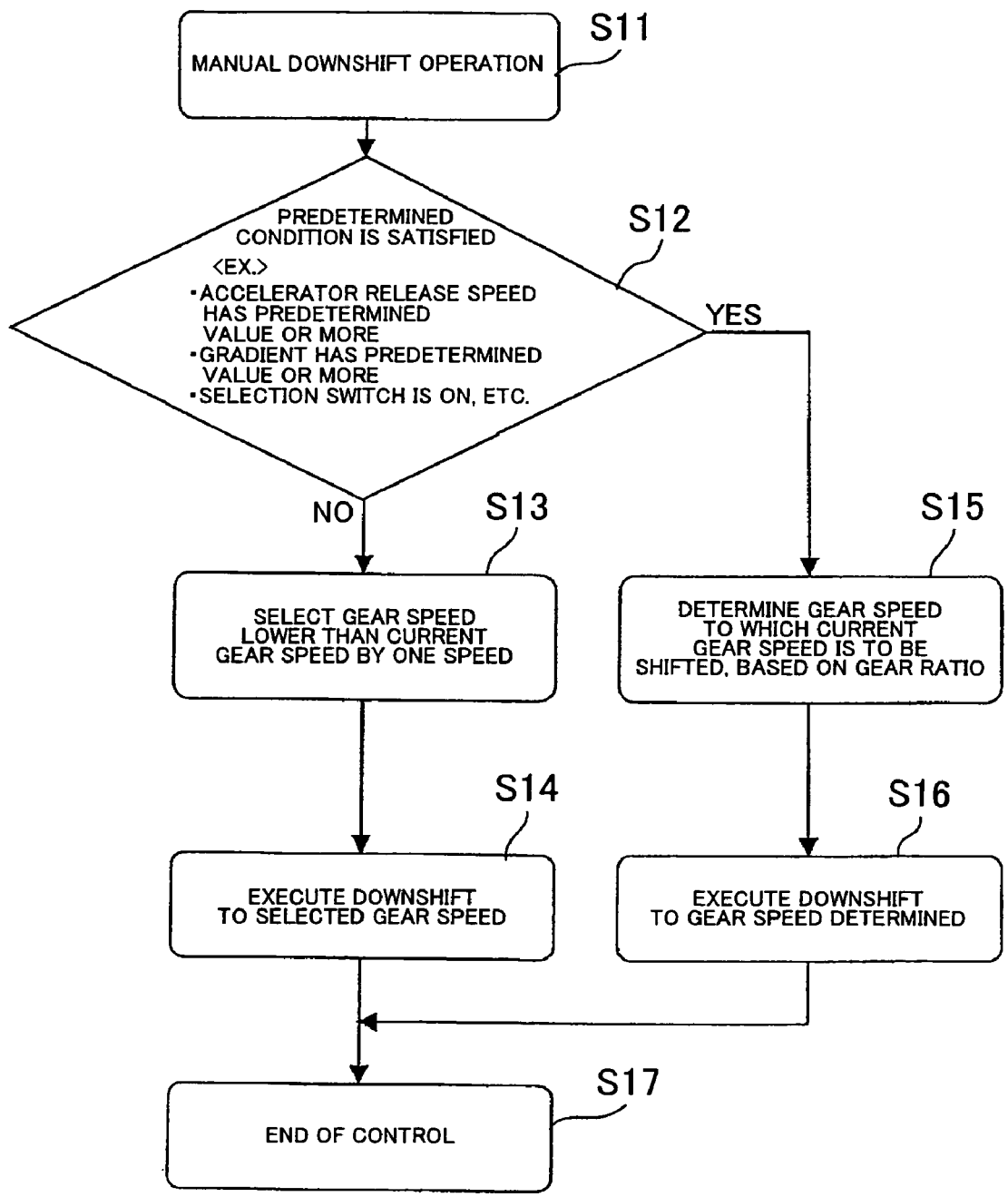
FIG. 6 is a flow chart containing a switching between the jumping shift mode and a normal shift mode.

Subsequently, a second embodiment of the present invention will be described with reference to FIG. 6. In the present embodiment, as shown in FIG. 1, the jumping shift mode 52 described above and the normal shift mode 53 for shifting one speed at a time as usual are switched between each other by the switching unit 55. The switching unit 55 performs switching based on the selection switch signal 61 from the selection switch 28 manually operated by the driver, on the accelerator release speed 62, on the road gradient determination 63, or on the like.

The selection switch 28 may be a switch dedicated to the switching between the jumping shift mode 52 and the normal shift mode 53, or may be a switch based on the driving intention of the driver such as power mode or economy mode. The accelerator release speed (accelerator pull-back speed) is obtained from the accelerator opening detected by the accelerator opening sensor 25 and from a clock unit. That is, in the case that the driver has performed a manual downshift operation within a specified time after fully closing the accelerator, the accelerator opening at a predetermined time before the accelerator has been fully closed is read out, and then the accelerator release speed is calculated. Based on this speed, the driver's intention for deceleration is determined depending on whether the driver has quickly released the accelerator in need of a rapid deceleration, or has slowly released the accelerator without need of a steep deceleration.

On the other hand, the road gradient determination 63 calculates the running resistance of the vehicle at anytime as needed, based on the accelerator opening detected by the accelerator opening sensor 25 and on the vehicle speed detected by the output shaft rotation speed (vehicle speed) sensor 27, and based on the running resistance, determines the gradient value of the road on which the vehicle is currently running, at anytime as needed. Note that the road gradient determination 63 may determine the road gradient, for example, based on the road information from a navigation system in the case of a vehicle equipped with the navigation system, or may determine the road gradient, for example, by using a vehicle inclination sensor, or furthermore may determine the road gradient more accurately by combining these methods.

If the road has an approximately level surface with a gradient of a predetermined value or less, the normal shift mode for shifting one speed at a time suffices the need, without requiring the jumping shift mode. At the time when the driver has performed a manual downshift operation, if the vehicle is running on an uphill slope with a predetermined gradient or more, only insufficient torque can be produced by a downshift of one speed, thus necessitating the jumping shift mode. In addition, if the vehicle is running on a downhill slope with a predetermined gradient or more, only insufficient engine brake force can be produced by a downshift of one speed, also necessitating the jumping shift mode.

The operation of the present embodiment will be described with reference to FIG. 6. At the time when one operation of the shift lever 21 has been performed to the downshift side (S11), if the accelerator release speed (accelerator pull-back speed) 62 has a predetermined value or more, that is, if the driver intends to make a quick deceleration, the jumping shift mode 52 is selected (S12). If the road gradient on the uphill side is equal to or more than a predetermined gradient, the above-mentioned jumping shift mode is selected because only insufficient torque may be produced by a speed reduction of one speed (S12). If the road gradient on the downhill side is equal to or more than a predetermined gradient, the above-mentioned jumping shift mode is selected because sufficient engine brake force is not produced by a speed reduction of one speed (S12). The above-mentioned jumping shift mode is also selected by manual operation of the selection switch by the driver (S12). The switching of the switching unit 55 can be achieved by any one of the selection switch signal 61, the accelerator release speed 62, or the road gradient determination 63, and not limited to these signals or determination, the switching may be achieved by other determinations or the like, as a matter of course.

In the case that the jumping shift mode 52 is selected by the step S12, a downshift of a predetermined number of speeds is executed such as the speeds from the seventh or eighth speed to the sixth speed, to the fourth speed, to the second speed, and to the first speed, by steps S15 and S16 that are similar to the flow (S2 and S3 in FIG. 4) of the jumping shift mode described above.

In the case that the normal shift mode 53 is selected by the step S12, the shift speed (gear speed) that is lower by one speed than the current shift speed (gear speed) at the time of the manual downshift operation is selected (S13), and then the downshift to the selected shift speed (gear speed) is executed (S14). Hereby, the downshift control by one downshift operation of the shift lever 21 is finished (S17).

Note that, if the shift lever 21 is quickly operated more than one time in the manual mode (Mmode), that is, if it is detected that the shift lever is operated to the downshift side more than one time in a comparatively short time period, the control apparatus of an exemplary aspect of the present invention may be structured so as to cancel the jumping shift mode (52) and switch the mode to the normal shift mode (53). Alternatively, the control apparatus of an exemplary aspect of the present invention may be structured so as to execute the downshift in response to the first downshift operation of the shift lever in the jumping shift mode, and switch the mode to the normal shift mode for the downshift in response to the second or later downshift operation if the second downshift operation has been performed consecutively following the first downshift operation, that is, in a comparatively short time after the first downshift operation. Hereby, it can be prevented that the driver unintentionally performs excessively rapid downshift operation in the jumping shift mode without knowing that the mode is the jumping shift mode.

Some exemplary aspects of the present invention is applied to an automatic transmission mounted on a motor vehicle, and is particularly suitable for use in an automatic transmission with a large number of shift speeds, being used in an automatic transmission that allows a manual shift operation.

According to an exemplary aspect of the invention, because the jumping shift mode that is included in the manual shift mode and composed of a smaller number of shift speeds than the number of shift speeds of the automatic shift mode is provided, and because the downshift is performed based on the above-mentioned jumping shift mode when the downshift command is issued by an operation of the manual operation unit, the downshift in the manual shift mode can quickly achieve a deceleration to a desired shift speed with a comparatively small number of shift speeds of, for example, five forward speeds without performing troublesome operation, even in the multi-speed shifting of, for example, eight forward speeds.

According to an exemplary aspect of the invention, the normal shift mode with the same number of shift speeds as the automatic transmission and the above-mentioned jumping shift mode can be switched between each other as required.

According to an exemplary aspect of the invention, the above-mentioned jumping shift mode is selected when at least one of the following conditions is satisfied: the driver intends to make a quick deceleration by quickly releasing the accelerator; a large torque or engine brake force is required because the gradient of the road has a predetermined value or more; and the driver has selected a quick downshift using the selection switch.

According to an exemplary aspect of the invention, if the present invention is applied to an automatic transmission with eight forward speeds, the downshift in the manual shift mode can achieve a desired shift speed as quickly as that of an automatic transmission with five forward speeds.

What is claimed is:

1. A control apparatus for an automatic transmission capable of operating in an automatic shift mode in which a speed ratio is automatically selected based on driving conditions of a vehicle, and a manual shift mode in which the speed ratio is changed based on an upshift command and a downshift command by manual operation of a manual operation unit, the control apparatus comprising:
a controller that operates in a jumping shift mode that is included in the manual shift mode and that is composed of a smaller number of shift speeds than a number of shift speeds of the automatic shift mode;
wherein the controller performs a downshift from a shift speed of the jumping shift mode at a time when the downshift command is issued by an operation of the manual operation unit based on the shift speed of the jumping shift mode.

2. The control apparatus for the automatic transmission according to claim 1, wherein:
the controller operates in a normal shift mode that is included in the manual shift mode and that is composed of a same number of shift speeds as the number of shift speeds of the automatic shift mode; and
the controller switches between the jumping shift mode and the normal shift mode.

3. The control apparatus for the automatic transmission according to claim 2, wherein the controller switches from the normal shift mode to the jumping shift mode when at least one of the following conditions is satisfied: an accelerator release speed has a predetermined value or more; a gradient of a road has a predetermined value or more; and a manual selection switch is set to the jumping shift mode.

4. The control apparatus for the automatic transmission according to claim 1, wherein the automatic shift mode has eight forward speeds, and the jumping shift mode has five forward speeds.

5. The control apparatus for the automatic transmission according to claim 1, wherein a plurality of shift speeds in the automatic shift mode is merged into a single shift speed in the jumping shift mode.

6. The control apparatus for the automatic transmission according to claim 5, wherein the plurality of shift speeds in the automatic shift mode is merged into the single shift speed in the jumping shift mode when the downshift occurs in the jumping shift mode.

7. A control apparatus comprising:
a controller that operates in a jumping shift mode that is included in a manual shift mode and that is composed of a smaller number of shift speeds than a number of shift speeds of an automatic shift mode;
wherein the controller performs a downshift from a shift speed of the jumping shift mode at a time when a downshift command is issued by an operation of a manual operation unit based on the shift speed of the jumping shift mode.

8. The control apparatus according to claim 7, wherein:
the controller operates in a normal shift mode that is included in the manual shift mode and that is composed of a same number of shift speeds as the number of shift speeds of the automatic shift mode; and
the controller switches between the jumping shift mode and the normal shift mode.

9. The control apparatus according to claim 8, wherein the controller switches from the normal shift mode to the jumping shift mode when at least one of the following conditions is satisfied: an accelerator release speed has a predetermined value or more; a gradient of a road has a predetermined value or more; and a manual selection switch is set to the jumping shift mode.

10. The control apparatus according to claim 7, wherein the automatic shift mode has eight forward speeds, and the jumping shift mode has five forward speeds.

11. The control apparatus according to claim 7, wherein a plurality of shift speeds in the automatic shift mode is merged into a single shift speed in the jumping shift mode.

12. The control apparatus according to claim 11, wherein the plurality of shift speeds in the automatic shift mode is merged into the single shift speed in the jumping shift mode when the downshift occurs in the jumping shift mode.

13. A method of controlling an automatic transmission capable of operating in an automatic shift mode in which a speed ratio is automatically selected based on driving conditions of a vehicle, and a manual shift mode in which the speed ratio is changed based on an upshift command and a downshift command by manual operation of a manual operation unit, the method comprising:
determining whether an operator has operated the manual operation unit in order to move from the automatic shift mode to the manual shift mode; and
operating in a jumping shift mode that is included in the manual shift mode and that is composed of a smaller number of shift speeds than a number of shift speeds of the automatic shift mode when the operator moves to the manual shift mode;

wherein a downshift from a shift speed of the jumping shift mode is performed at a time when the downshift command is issued by an operation of the manual operation unit based on the shift speed of the jumping shift mode.

14. The method according to claim 13, further comprising:
operating in a normal shift mode that is included in the manual shift mode and that is composed of a same number of shift speeds as the number of shift speeds of the automatic shift mode; and switching between the jumping shift mode and the normal shift mode.

15. The method according to claim 14, wherein a switch from the normal shift mode to the jumping shift mode occurs when at least one of the following conditions is satisfied: an accelerator release speed has a predetermined value or more; a gradient of a road has a predetermined value or more; and a manual selection switch is set to the jumping shift mode.

16. The method according to claim 13, wherein the automatic shift mode has eight forward speeds, and the jumping shift mode has five forward speeds.

17. The method according to claim 13, wherein a plurality of shift speeds in the automatic shift mode is merged into a single shift speed in the jumping shift mode.

18. The method according to claim 17, wherein the plurality of shift speeds in the automatic shift mode is merged into the single shift speed in the jumping shift mode when the downshift occurs in the jumping shift mode.

* * * * *